Figure 1:
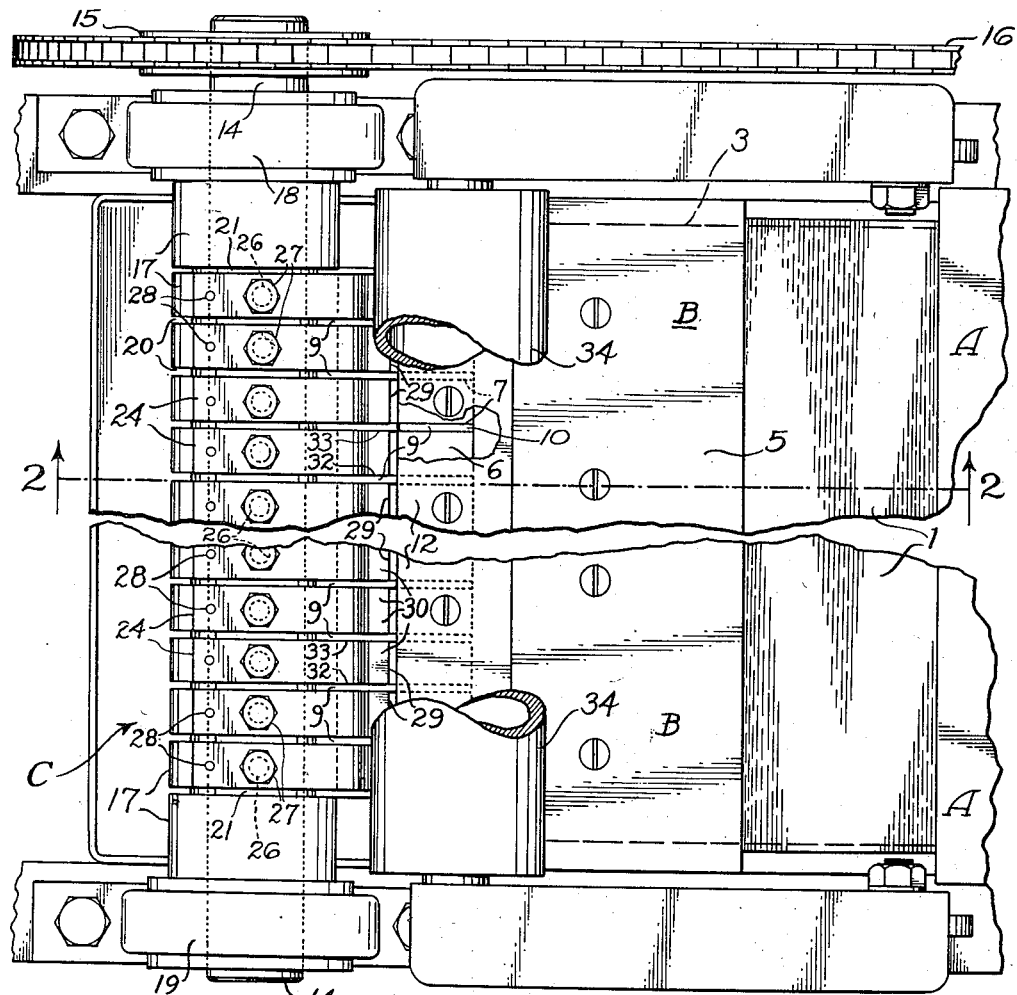

Jan. 14, 1958   J. A. HERVIN   2,819,747
CUTTING MECHANISM FOR CONTINUOUSLY MOVING BAKED SHEETS
Filed April 26, 1956

INVENTOR.
Jason A. Hervin
BY Samuel Jacobson
Atty.

United States Patent Office 2,819,747
Patented Jan. 14, 1958

2,819,747

CUTTING MECHANISM FOR CONTINUOUSLY MOVING BAKED SHEETS

Jason A. Hervin, Portland, Oreg.

Application April 26, 1956, Serial No. 580,923

2 Claims. (Cl. 146—119)

This invention, while relating generally to tunnel type band ovens in which dough sheets are baked and conveyed toward cutting mechanisms, specifically relates to the cutting mechanism employed in conjunction with such ovens for continuously dividing these sheets into particles of pre-determined sizes and shapes.

The art of baking food products for ultimate human or animal consumption from a dough sheet traveling through a heated tunnel on an endless conveyor and being immediately divided into small particles of pre-determined size and shape, is well-known. Such baked sheets, while being divided, have a tendency to crumble and form small crumbs or "fines" which must be screened out before the particles are placed in containers for distribution to the purchasing public.

Some effort has been made to eliminate the creation of crumbs or "fines," when these baked sheets are divided into particles as indicated in United States Patents Nos. 2,582,154 and 2,646,832. These and other patents pertaining to cutting machines employ essentially the same methods of severing these sheets into small particles, but they do not entirely eliminate the creation of crumbs or "fines" which the dog and cat food manufacturers consider as detrimental to the production of a product of uniform size and shape that will not readily disintegrate into crumbs or "fines."

Consequently, the quintessence of my invention is to provide a cutting mechanism, to be used in conjunction with a tunnel type oven for baking a dough sheet of uniform width and thickness, which does not gouge but cleanly cuts particles from the baked sheet as it continuously travels toward the cutting mechanism.

A corollary object of my invention is to provide a cutting mechanism which shears uniformly sized particles from a continuously moving baked sheet without producing any resulting waste product.

A further object of my invention is to provide a cutting mechanism, the elements of which can be readily replaced if damaged, easily removed for sharpening and, though relatively simple and economical in construction, is highly efficient in operation.

Figure 2:
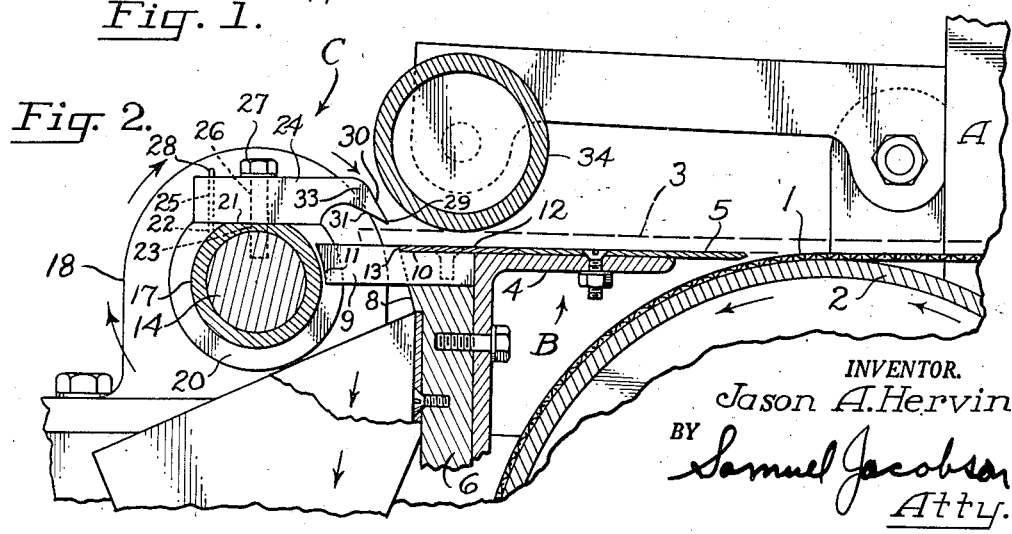

A full and complete understanding of the invention and other objects and advantages may be further obtained from a consideration of the following detailed description, which must be read in connection with the disclosure in the drawing forming a part hereof and in which:

Fig. 1 is a fragmentary, top plan view, partly broken away and partly in section, of the cutting mechanism embodying my invention, showing the respective elements of the cutting mechanism in relation to each other and to a portion of a tunnel type oven; and Fig. 2 is a fragmentary, sectional side view, partly broken away, taken on line 2—2 of Fig. 1 looking in the direction indicated by the arrows, showing some of the structural details of the cutting mechanism and of a portion of the tunnel type oven and graphically revealing the relationship between them.

Preliminary to a detailed description of the invention it is considered appropriate to point out that the invention may be employed in conjunction with any conventional tunnel type continuous band oven into which at one end thoroughly inter-mixed ingredients forming a conglomerate dough mixture are fed as a continuous sheet. The sheet is then carried through the oven by an endless conveyor until baked and then discharged through the other end of the oven as a baked product, and finally positively advanced beyond the oven and over a platform to be subdivided into uniformly shaped and sized particles by the cutting mechanism embodying the invention hereinbelow described.

Since the oven is of conventional design, only a fragmentary portion of it is shown in Figures 1 and 2 of the drawing and, in order to graphically reveal the cooperative relationship between the cutting mechanisms embodying the invention and the oven platform, some of its structural features are herewith described.

A fragment of a tunnel type oven of conventional design, generally designated by reference character A, has an endless conveyor belt composed from a heat resistent material, such as a metallic screening 1 traveling therethrough which then passes over drum 2, moving in a counter-clockwise direction, as shown by the arrows. Drum 2 may be the driving or idler drum for the conveyor belt 1 and in any event the conveyor belt acts as the carrier for the dough sheet 3, during and after the baking process. A platform, generally designated by reference character B over which the baked product travels toward the cutting mechanism, is positioned in direct frontal alignment to conveyor belt 1 throughout its entire width. Platform B has a reinforced supporting frame 4 to which a feed plate 5 is removably secured in juxtaposed relation thereto and in lateral alignment to the top surface of the conveyor 1 throughout its entire width.

A shearing plate supporting bed 6 is removably secured to and extends transversely of frame 4 with its top in lateral alignment therewith. A plurality of equally spaced parallel slots or furcations 7 are formed through the entire top of bed 6 and the upper portion of the side of bed 6 is slightly angled inwardly and away from the cylindrical locus of the cutting edge of the blades yet to be described, as shown at 8, in order to eliminate or minimize any possible compression of the severed particles in their downward traverse.

A plurality of shearing plates 9, each possessing identical structural characteristics, are snugly positioned within the slots or furcations 7 formed through the top of bed 6. The shearing plates, with approximately half of their length confined in slots or furcations 7, extend transversely along the top of bed 6 in a uniform pattern. Since, as stated, these shearing plates have identical structural characteristics, the detailed description of one will suffice for all of them.

Each of the shearing plates 9 is substantially rectangular in shape, fabricated of case hardened steel, and of a thickness approximately equal to the width of the slots or furcations 7. A cut-out 10 is provided at the top rear portion of each blade, the length of which being equal to the thickness of the top of the supporting bed 6, so that the portion of the shearing plates 9 confined in their respective slots or furcations do not protrude beyond the top of the supporting bed 6. The forward end of each of the extended portions of shearing plates 9 is arcuated, as shown at 11, along a curve which coincides with the peripheral circumference of the cutter blade supporting cylinder yet to be described. It will become evident as the description unfolds that the extended side walls of shearing plates 9 coact with the sides of the cutter blades not as yet described, to produce a shearing action therebetween and therefore the junctures between these walls and the top of the shearing plates must be maintained in sharpened condition for satisfactory results.

A stationary cutter bar 12, composed of either soft or case hardened steel, is positioned transversely of and contiguous to feed plate 5 and is removably secured to the supporting bed 6 in any desirable fashion and covering the slots or furcations 7 of the supporting bed 6 to prevent the vertical movement of shearing plates 9. The thickness of the cutter bar is equal to the thickness of the feed plate thus presenting a smooth surface over which the baked sheet may travel toward the cutting mechanism. The front end of the cutter bar 12 is slightly angled inwardly as shown at 13 to coincide with the angled contour of the exposed face or side of bed 6. Since the front edge of the cutter bar 12 will coact with the front edge of the cutter blades to be described to produce a shearing action therebetween, it is necessary to maintain said front edge of the stationary cutter bar in a sharpened condition.

The cutter blade operating assembly, generally designated by reference character C, is positioned in transverse and complementary relationship to platform B. It consists of a shaft 14, appropriately journaled and rotated in a clock-wise direction from a prime mover and speed reducer (not shown) by means of a conventional drive, such as sprocket 15 coacting with driving chain 16. It should be pointed out that the endless conveyor belt 1 is not actuated by the same prime mover used for rotating shaft 14, since it is desirous to vary the speed of travel of baked sheet 3 toward the cutting mechanism in order to increase or reduce the size of the particles being cut.

A cylinder 17 is keyed or otherwise secured around shaft 14 and is confined between the shaft supporting journals 18 and 19. A plurality of parallel spaced grooves 20 are formed about the periphery of the cylinder and are approximately equal in width to the thickness of the shearing plates 9, each of which extends into a corresponding groove. By this construction the respective shearing plates are held in proper alignment at all times with the cutter blades hereinafter described. Cylinder 17 has a flat surface 21 formed lengthwise on its outer periphery in which a plurality of spaced parallel aligned recesses 22 are formed. Also provided within the cylinder 17 on its flat surface 21 are spaced parallel aligned threaded recesses 23 each of which is positioned in spaced coinciding relation to a corresponding recess 22.

The composition of the food product in sheet form is such that even though it reaches the cutting mechanism in a relatively warm state it is still friable enough to disintegrate into pieces unless satisfactory means are provided to sever the sheet into the desired sizes and shapes. Furthermore, it is essential that the cutting mechanism should not create excessive frictional heat in the cutting process otherwise the particles thus formed will become overbaked and hardened to such a degree that they will be almost impervious to liquids, liquids being an essential adsorbent for the particles before they are useful as an animal food. This is accomplished by providing a plurality of cutter blades 24, fabricated from case hardened steel, which are positioned in series between grooves 20 in tangential relation to the flat surface 21 of cylinder 17. Each of these cutter blades has a pair of openings 25 and 26 therethrough of different diameters to each other but possessing identical diameters to their respective recesses 22 and 23 and spaced to coincide therewith. Each of the cutter blades 24 is threadably secured to the cylinder 17 by a bolt 27 entering the recesses 23 and 26 and these blades are retained against misalignment by insertion of an aligning pin 28 into respective recesses 22 and 25, the lower ends of bolts 27 projecting into radial bores formed in shaft 14 and aligned with recesses 23.

The cutting end of each cutter blade 24 is rather severely beveled to provide a relatively obtuse curvature rearwardly from the cutting edge 29. Immediately below the beveled top 30, is an arcuate cut-out 31 which emanates from the cutting edge 29 and extends rearwardly approximately one-fourth of the length of the cutter blade 24. The above described structural characteristics of each cutter blade results in a wedge shaped frontal portion which is not only essential to provide a relatively sharp cutting edge 29, but is essential to provide unimpeded clearance to the instantaneous continued movement of the baked sheet as it is being cut in order to avoid its buckling against the front end of the cutter blade which itself by its cutting action tends to draw the sheet forward during the cutting process. And the undercut contour is essential to provide adequate clearance to the sheared particles immediately after being cut, as otherwise they would be compressed by the blade structure and caused to crumble. The sides 32 and 33 of the wedge shaped portion of each cutter blade are sharpened at their meeting ends with the beveled top 30. The length of each cutter blade 24 is such that, when they are securely positioned in relation to the cylinder 17 in the manner above described, the cylindrical locus through which their cutting edges travel as cylinder 17 rotates, extends tangentially to the sharpened edge of the stationary cutter bar 12 coacting therewith like the blades of a pair of shears. Furthermore, as cylinder 17 is rotated the sides 32 and 33 of each cutter blade 24 coact with the side walls of pairs of shearing plates 9 resulting in a shearing action therebetween. Thus in effect, during a complete rotation of the cylinder 17, a three-fold shearing operation is expeditiously and cleanly accomplished.

As the baked sheet 3 moves forward toward the cutting assembly C it is retained against flexion by idler roller 34 which is mounted transversely of the cutter bar 12 and pivotally engaged in any desirable manner to the platform assembly B. From the foregoing description of the various members forming a part of the cutting mechanism it can be clearly seen that as the baked sheet 3 moves forward, it will pass beyond the edge of the cutter bar 12. Since the rotation of the cylinder containing the cutter bars is timed to the movement of the baked products 3, only the desired amount of the sheet will pass beyond the cutter bar edge before the cutter blades, in their respective coaction with the cutter bar and the shearing plates, will sever the overhanding portion into a multiplicity of particles of a width equal to the width of each cutter blade and of a length determined by the speed of rotation of the cylinder and the movement of the baked sheet. Furthermore, as these particles are severed from the baked sheet the contour of the cut-out portion 31 gives sufficient clearance to them in order to avoid excessive compression and possible crumbling while the contour of the top portion 30 allows the baked sheet 3 to freely move forward. It would seem that uncut portions of baked sheet 3 would form between and overlie shear plates 9, but in practice this is not the case, since the shear plates are rather narrow and the shearing action of the blades 24 consumes all of that portion of sheet 3 as it is made available for cutting.

To those skilled in the art to which this invention appertains, changes and modifications may come to mind which, however, do not depart from the scope and spirit of the invention. I, therefore, do not wish to be limited to the precise disclosures illustrated in the drawings and hereinabove described; having fully described the objects and nature of my invention, what I claim as novel and upon which I desire to secure Letters Patent is:

1. In a machine having a platform over which a baked dough sheet moves continuously to be subdivided, in combination, a cutting mechanism assembly comprising, a shear plate supporting member positioned at one extremity of said platform said member having a plurality of uniformly spaced slots transversely thereof, a shear plate positioned in each of said slots with a portion extending outwardly therefrom, a cutter bar completely covering the portions of the shear plates disposed in said slots and secured to said member, a cylinder having means for retaining the extended portions of the shear plates in uniformly spaced and positive alignment, disposed in front of said cutter bar and said shear plates, and a plurality of coacting cutter blades extending tangential thereto in alignment with the spaces between the extended portions of said shear plates and adapted to coact with the forward edge of said cutter bar and the sides of the shear plates, said cutter bar and said shear plate supporting member having their respective forward faces inclined rearwardly from the cylindrical locus defined by the movement of the cutter edges of the cutter blades.

2. In a machine for cutting a continuously moving baked sheet comprising, in combination, a shear plate supporting member secured to the front of the cutting machine, said member having a plurality of uniformly spaced slots formed therein, a plurality of shear plates positioned in said slots with a portion thereof extending outwardly at right angles to the supporting member, a stationary cutter bar positioned transversely of the multi-slotted portion of the supporting member adapted to retain the shear plates in said slots, a rotatable cylinder having means thereon for receiving the projecting portion of the shear plates and preventing their misalignment and displacement, a plurality of parallel and uniformly spaced cutter blades removably secured in tangential relation to the cylinder and extending in one direction in alignment with each other, each of said cutter blades having its front portion wedge-shaped with the top thereof rearwardly beveled and the underside thereof having a cut-out arcuate in contour and having its forward edge and sides sharpened to simultaneously coact with said shear plates and stationary cutter bar with each complete rotation of said cylinder to cut a baked sheet as it moves into the path of the cutter blades.

References Cited in the file of this patent

UNITED STATES PATENTS

| | | |
|---|---|---|
| 943,308 | Jorgensen | Dec. 14, 1909 |
| 1,394,911 | King | Oct. 25, 1921 |
| 1,567,920 | Cumfer | Dec. 29, 1925 |